United States Patent [19]
Parente

[11] Patent Number: 5,841,079
[45] Date of Patent: Nov. 24, 1998

[54] COMBINED ACOUSTIC AND ANTI-ICE ENGINE INLET LINER

[75] Inventor: Charles A. Parente, Oyster Bay, N.Y.

[73] Assignee: Northrop Grumman Corporation, Los Angeles, Calif.

[21] Appl. No.: 962,863

[22] Filed: Nov. 3, 1997

[51] Int. Cl.[6] ............ B64D 33/02; B64D 15/04
[52] U.S. Cl. .............. 181/214; 244/134 B
[58] Field of Search .................. 181/210, 213, 181/214, 222, 290, 292; 244/134 R, 134 A, 134 B, 134 C, 134 E, 207, 210

[56] References Cited

U.S. PATENT DOCUMENTS

| | | | |
|---|---|---|---|
| 3,820,628 | 6/1974 | Hanson | 181/213 |
| 3,821,999 | 7/1974 | Guess et al. | . |
| 3,917,193 | 11/1975 | Runnels, Jr. | 244/134 B |
| 3,933,327 | 1/1976 | Cook et al. | 244/134 B |
| 4,508,295 | 4/1985 | Cattaneo et al. | 244/134 A |
| 4,738,416 | 4/1988 | Birbragher | 244/134 B |
| 4,749,150 | 6/1988 | Rose et al. | . |
| 4,757,963 | 7/1988 | Cole | 244/134 B |
| 4,759,513 | 7/1988 | Birbragher | . |
| 4,926,963 | 5/1990 | Snyder | . |
| 5,011,098 | 4/1991 | McLaren et al. | 244/134 B |
| 5,025,888 | 6/1991 | Arcas et al. | . |
| 5,041,324 | 8/1991 | Siegling et al. | . |
| 5,415,522 | 5/1995 | Pla et al. | . |
| 5,423,658 | 6/1995 | Pla et al. | . |
| 5,498,127 | 3/1996 | Kraft et al. | . |
| 5,590,849 | 1/1997 | Pla | . |

*Primary Examiner*—Khanh Dang
*Attorney, Agent, or Firm*—Terry J. Anderson; Karl J. Hoch, Jr.

[57] ABSTRACT

In accordance with the present invention, in an air vehicle having a turbo engine including an inlet which receives intake airflow and is defined by an inner surface and a D-nose of the turbo engine, there is provided an inlet liner for improved acoustic, anti-ice and drag performance. The inlet liner is provided with a permeable acoustic layer formed to attenuate sound and defines the D-nose. The inlet liner is further provided with a pressurized fluid injecting device. The pressurized fluid injecting device is in fluid communication with the permeable acoustic layer and formed to inject fluid through the permeable acoustic layer at the D-nose to reduce drag of the intake airflow. The pressurized fluid injecting device is further formed to inject fluid through the permeable acoustic layer at a temperature sufficient to perform an anti-ice function at the D-nose.

19 Claims, 2 Drawing Sheets

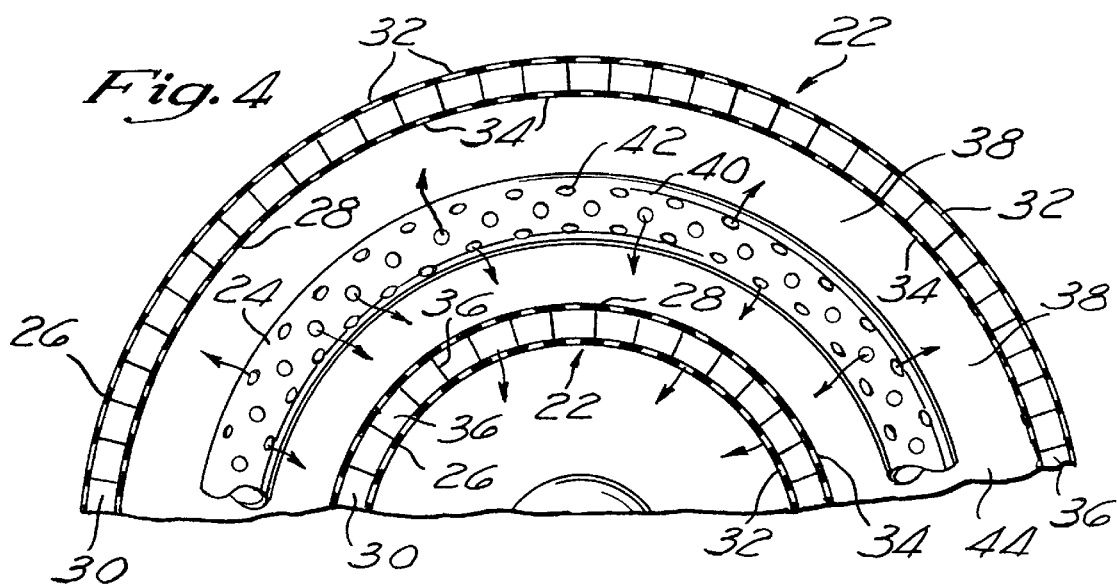
Fig. 4
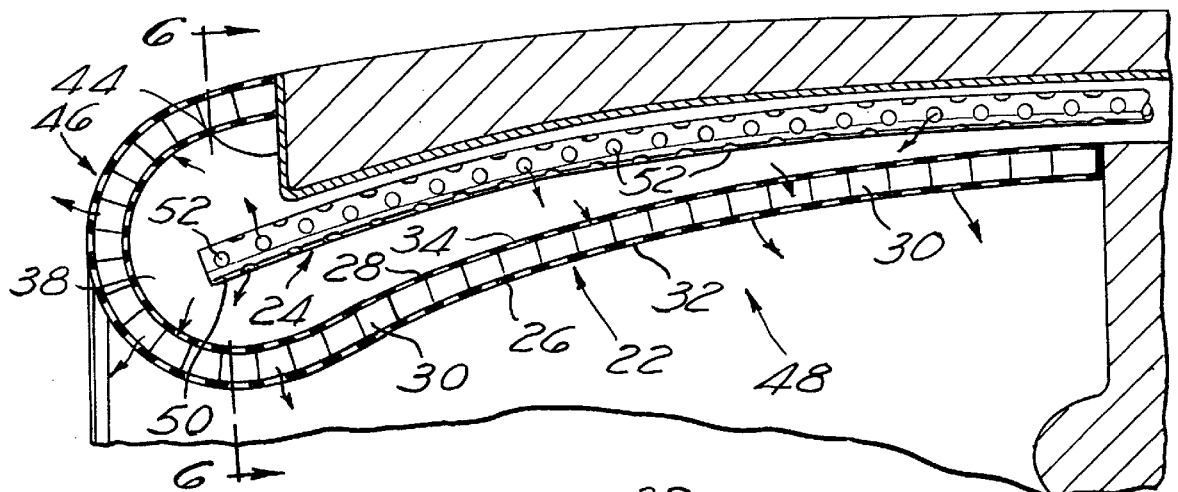
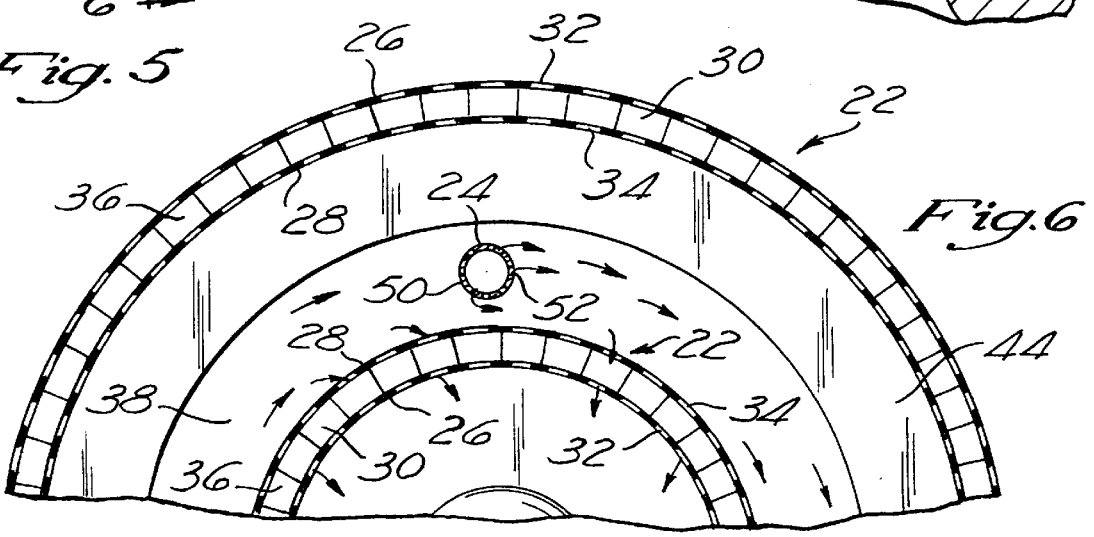
Fig. 5
Fig. 6

COMBINED ACOUSTIC AND ANTI-ICE ENGINE INLET LINER

FIELD OF THE INVENTION

The present invention relates generally to an air vehicle engine inlet liners, and more particularly to engine inlet liners designed to perform acoustic and antiice functions.

BACKGROUND OF THE INVENTION

In order to comply with Governmental noise regulations, air vehicles having turbo engines, such as commercial airliners, utilize acoustic treatments or acoustic liners inside the inlet of the engine nacelle to reduce far field radiated noise. The length of the inlet plays a vital role in determining the noise footprint of the turbo engine. A longer inlet provides a corresponding increase of inner surface area on which acoustic treatment may be located and thus a quieter noise footprint.

The length of the inlet, however, impacts the efficiency of the engine and the overall performance of the air vehicle. The inner surface of the inlet produces frictional drag of the intake airflow and reduces the engine performance. In addition, the exterior surface of the inlet is subject to external airflow friction drag which directly impacts the aerodynamic efficiency of the air vehicle. Moreover, the length of the inlet dictates the weight of the engine nacelle which directly impacts air vehicle performance. Thus, without regard to acoustic concerns, it is generally desirable to reduce the length of the inlet.

Conventional acoustic treatments or liners are located inside the engine inlet of the nacelle and cover the area aft of the minimum inlet diameter to the turbo engine fan face. A typical acoustic treatment installed in commercial engines consists of a porous frontface skin, a honeycomb core and an impervious backface skin. This design facilitates sound attenuation by the Helmholz Resonator effect whereby cavities in the honeycomb core dissipate acoustical energy after its admittance through the frontface skin.

Greater far field noise attenuation is achievable if acoustic treatment is installed forward of the minimum inlet diameter of the inlet so as to attenuate the noise radiating out the inlet. This forward region is denoted as the D-nose or lip of the inlet. Acoustic treatment is not conventionally installed at the D-nose location, however, because anti-ice systems are located at that position.

Ice build-up at the D-nose presents several problems. Most troublesome is the potential for chunks of ice breaking off and entering the inlet, thereby causing damage to internal engine components and loss of engine performance. Further, ice build-up alters the contours of the inlet D-nose and produces undesirable aerodynamic effects. Conventional anti-ice systems inject hot air directly to the internal surface of the D-nose skin to efficiently prevent ice build-up during normal engine operations. Thus, this system of directly heating the D-nose surface is incompatible with conventional acoustic treatments. Additionally, acoustic treatment of the nature described are not installed at the D-nose due to the concern that the acoustic treatment would become clogged or plugged by foreign debris contained in the intake airflow (e.g., insects).

Accordingly, there is a need in the art for a turbo engine inlet liner design which is able to facilitate noise reduction, anti-ice and drag reduction functions, while addressing the various above-described problems of previous designs, without incurring significant penalties in relation to aerodynamics and overall performance of the engine and the air vehicle.

SUMMARY OF THE INVENTION

In accordance with the present invention, in an air vehicle having a turbo engine including an inlet which receives intake airflow and is defined by an inner surface and a D-nose of the engine, there is provided an inlet liner for improved acoustic, anti-ice and drag performance. The inlet liner is provided with a permeable acoustic layer formed to attenuate sound and defines the D-nose. The inlet liner is further provided with a pressurized fluid injecting device. The pressurized fluid injecting device is in fluid communication with the permeable acoustic layer and formed to inject fluid through the permeable acoustic layer at the D-nose to reduce drag of the intake airflow. The pressurized fluid injecting device is further formed to inject fluid through the permeable acoustic layer at a temperature sufficient to perform an anti-ice function at the D-nose. Accordingly, the permeable acoustic layer facilitates a noise reduction function, while the injection of pressurized, heated fluid facilitates anti-ice and friction reduction functions. Thus, the present invention concurrently accomplishes noise reduction, anti-ice and friction reduction functions at the D-nose.

In addition, the permeable acoustic layer defines the inner surface and the pressurized fluid injecting device is formed to inject fluid through the permeable acoustic layer at the inner surface to further reduce drag of the intake airflow.

In the preferred embodiment, the permeable acoustic layer is provided with a frontface skin and a backface skin which are formed to allow fluid to pass therethrough. An acoustic core is provided which is disposed between and in fluid communication with the frontface skin and the backface skin. The acoustic core is formed to allow pressurized, heated fluid to pass therethrough. The acoustic core is formed to attenuate sound. Thus, pressurized fluid is allowed to flow through the permeable acoustic layer (i.e., the backface skin, the acoustic core and the frontface skin) to interact with intake airflow, having a smoothing effect of the inlet and thereby reducing drag. Concurrently, the pressurized fluid provides sufficient heat so as to mitigate ice build-up on the inlet at the D-nose.

In addition, in the preferred embodiment of the present invention, the frontface skin is provided with pores which are sized and configured to allow fluid to pass from the acoustic core to the intake airflow while allowing sound waves to pass from the intake airflow to the acoustic core. The backface skin is provided pores which are sized and configured to allow fluid to pass to the acoustic core. The acoustic core is provided with honeycomb cells which are sized and configured to attenuate sound.

In one embodiment of the present invention, the pressurized fluid injecting device is provided with a plenum which is in fluid communication with the backface skin. The pressurized fluid injecting device is provided with at least one piccolo tube which is disposed adjacent to the D-nose. Each piccolo tube is generally ring shaped and annularly disposed within the inlet. Thus, each piccolo tube forms an O-shape with the intake airflow passing therethrough. Each piccolo tube has a plurality of holes through which pressurized fluid is injected from within the piccolo tube into the plenum. The pressurized fluid injecting device is provided with a plenum wall which is disposed within the inlet. The plenum wall, in conjunction with the backface skin, defines the plenum. The plenum wall is provided with a D-nose portion adjacent to the D-nose of the inlet, annularly disposed within the inlet and generally perpendicular to the intake airflow. The plenum wall is provided with an inlet portion which is annularly disposed within the inlet about the inner surface of the inlet.

In another embodiment of the present invention, the pressurized fluid injecting device is provided with a plenum which is in fluid communication with the backface skin. The pressurized fluid injecting device is provided with at least one swirl tube. Each respective swirl tube is aligned generally parallel to the intake airflow. Each respective swirl tube has a plurality of holes through which pressurized fluid is injected from within the swirl tube into the plenum such that the injected fluid circulates circumferentially about the backface skin within the plenum. In addition, the pressurized fluid injecting device is provided with a plenum wall which is disposed within the inlet. The plenum wall, in conjunction with the backface skin, defines the plenum. The plenum wall is provided with a D-nose portion adjacent to the D-nose of the inlet, annularly disposed within the inlet and generally perpendicular to the intake airflow. The plenum wall is provided with an inlet portion which is annularly disposed within the inlet about the inner surface of the inlet.

In addition, wherein the inlet liner constructed in accordance with the present invention, the pressurized fluid injecting device is formed to inject fluid in response to sensed inlet conditions. The sensed inlet conditions may be any one or a combination of the following: drag on the inner surface and D-nose, temperatures at the inner surface and D-nose, ice build-up at the D-nose, and temperature, pressure and velocity of the intake airflow. In addition, the pressurized fluid injecting device is provided with a plenum which is in fluid communication with the permeable acoustic layer. The pressurized fluid injecting device is provided with at least one piccolo tube which is disposed adjacent to the D-nose. Each piccolo tube has a plurality of holes through which a pressurized fluid is injected from within the piccolo tube into the plenum. Each piccolo tube is generally ring shaped and annularly disposed within the inlet. Further, the pressurized fluid injecting device is provided with a plenum wall which is disposed within the inlet. The plenum wall, in conjunction with the permeable acoustic layer, defines the plenum. The plenum wall is annularly disposed within the inlet and is generally perpendicular to the intake airflow.

In addition, wherein the inlet liner constructed in accordance with the present invention, the pressurized fluid injecting device is provided with a plenum which is in fluid communication with the permeable acoustic layer. The pressurized fluid injecting device is provided with at least one swirl tube. Each swirl tube is aligned generally parallel to the intake airflow. Each swirl tube has a plurality of holes through which pressurized fluid is injected from within the swirl tube into the plenum such that the injected fluid circulates circumferentially about the permeable acoustic layer within the plenum. The pressurized fluid injecting device is provided with a plenum wall which is disposed within the inlet. The plenum wall, in conjunction with the permeable acoustic layer, defines the plenum. The plenum wall is annularly disposed within the inlet and is generally perpendicular to the intake airflow.

In addition, in accordance with the present invention, the pressurized fluid injecting device is formed to inject fluid in response to sensed inlet conditions. The pressurized fluid injecting device is preferably formed to inject heated air taken from the intake airflow from downstream of the inlet (e.g., from within the engine).

In another embodiment of the present invention, the above-described inlet liner may be disposed in an air vehicle turbo engine.

The present invention addresses the various problems associated with previous designs by uniquely injecting a pressurized, heated fluid through the permeable acoustic layer. The present invention mitigates prior art difficulties because it concurrently facilitates noise reduction, anti-ice and friction reduction functions at the D-nose of the inlet by adapting the conventional acoustic treatment from a non-flowing system to a system with pressurized fluid flowing through it. The pressurized fluid injected through the permeable acoustic layer interacts with intake airflow, having a smoothing effect and thereby reducing drag, while providing sufficient heat so as to mitigate build-up. Advantageously, the pressurized fluid acts to mitigate clogging of the acoustic layering at the D-nose by the foreign debris in the intake airflow.

The present invention allows for reduced inlet lengths for a given level of far field radiated noise because additional acoustic treatment is installed at the D-nose of the inlet. Correspondingly, an air vehicle utilizing the present invention will enjoy the benefit of greater overall engine and air vehicle performance.

BRIEF DESCRIPTION OF THE DRAWINGS

These, as well as other features of the present invention, will become more apparent upon reference to the drawings wherein:

FIG. 4 is a partial longitudinal cross-sectional view of a turbo engine depicted in FIG. 3 as seen along axis 4—4;

FIG. 5 is a partial lateral cross-sectional view of the turbo engine illustrating another embodiment of the present invention as seen along axis 5—5 of FIG. 1; and FIG. 6 is a partial longitudinal cross-sectional view of a turbo engine depicted in FIG. 5 as seen along axis 6—6.

DETAILED DESCRIPTION OF THE PREFERRED EMBODIMENT

Figure 1:
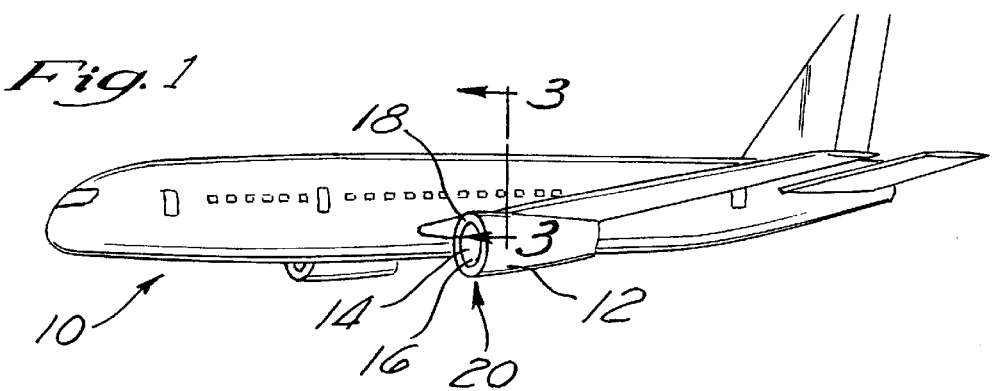
FIG. 1 is a perspective view of the present invention depicted in combination with a turbo engine of an air vehicle.

Referring now to the drawings wherein the showings are for purposes of illustrating a preferred embodiment of the present invention only, and not for purposes of limiting the same, FIGS. 1–6 illustrate an inlet liner of an inlet which is constructed in accordance with the present invention. As will be described in more detail below, the inlet liner is designed to improve the acoustic, anti-ice and drag performance of the inlet.

Figure 3:
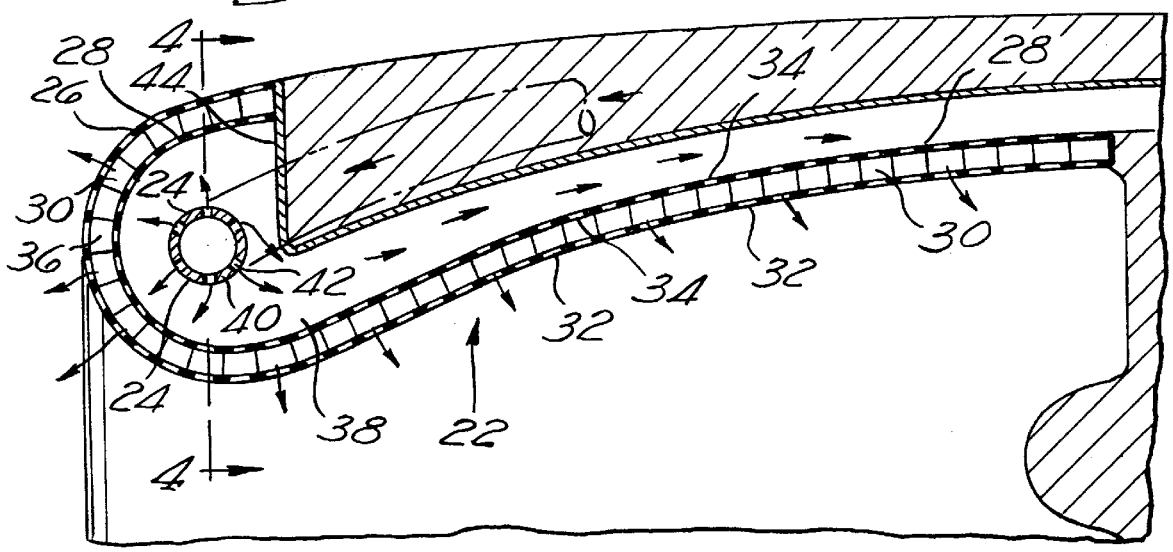
FIG. 3 is a partial lateral cross-sectional view of the turbo engine illustrating an embodiment of the present invention as seen along axis 3—3 of FIG. 1.

In accordance with the present invention, in an air vehicle 10 having a turbo engine 12 including an inlet 14 which receives intake airflow and is defined by an inner surface 16 and a D-nose 18 of the turbo engine 12, there is provided an inlet liner 20 for improved acoustic, anti-ice and drag performance. The D-nose 18 is best depicted in a longitudinal cross-sectional view of the turbo engine 12 as illustrated in FIGS. 3 and 5. As seen, the D-nose 18 is generally D-shaped. The D-nose 18 terminates at the location where the inlet 14 is at a minimum diameter. The inner surface 16 is connected to the D-nose 18 at this minimum inlet location, aft of the D-nose 18 and radially interior to the inlet 14. The inlet liner 20 is provided with a permeable acoustic layer 22 which is formed to attenuate sound and defines the D-nose 18. The inlet liner 20 is further provided with a pressurized fluid injecting device 24. The pressurized fluid injecting device 24 is in fluid communication with the permeable acoustic layer 22 and is formed to inject fluid through the permeable acoustic layer 22 at the D-nose 18 to reduce drag of the intake airflow. The pressurized fluid injecting device 24 is further formed to inject fluid through the permeable acoustic layer 22 at a temperature sufficient to perform an anti-ice function at the D-nose 18. Accordingly, the permeable acoustic layer 22 facilitates a noise reduction function, while the injection of pressurized, heated fluid facilitates anti-ice and friction reduction functions. Thus, uniquely, the present invention concurrently accomplishes noise reduction, anti-ice and friction reduction functions at the D-nose 18.

In addition, the permeable acoustic layer 22 defines the inner surface 16 and the pressurized fluid injecting device 24 is formed to inject fluid through the permeable acoustic layer 22 at the inner surface 16 to reduce drag of the intake airflow. In addition to reducing drag, it is contemplated that the injected fluid may facilitate an anti-ice function at this location.

Figure 2:
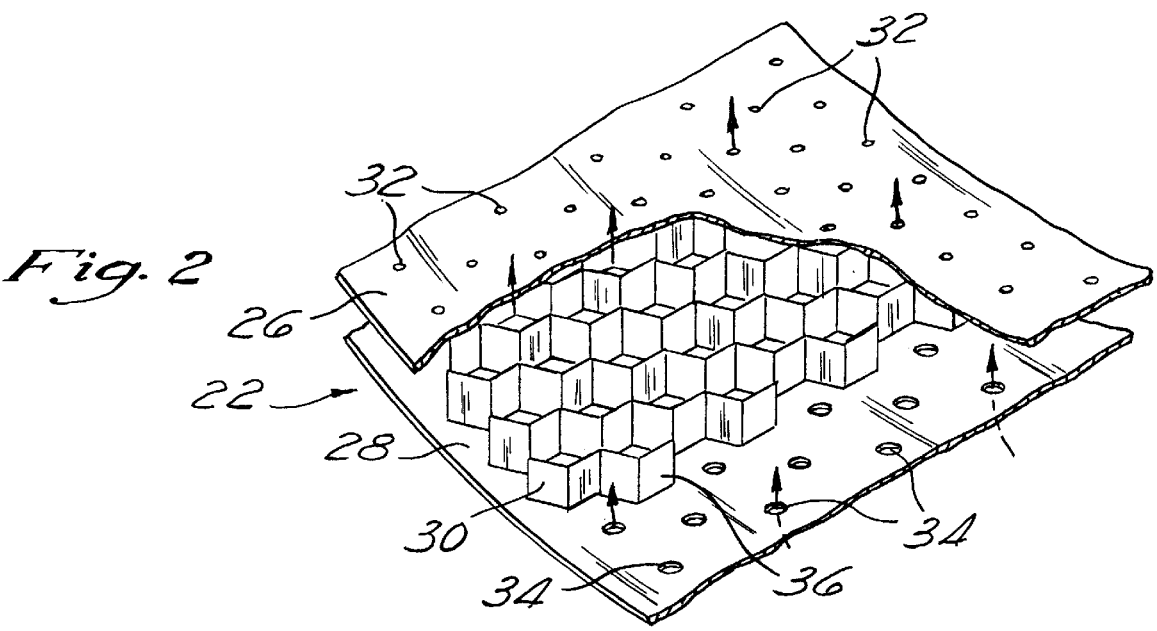
FIG. 2 is an exploded perspective cross-sectional view of a permeable acoustic layer constructed in accordance with the present invention.

In the preferred embodiment, as best illustrated in FIG. 2, the permeable acoustic layer 22 is provided with a frontface skin 26 and a backface skin 28 which are formed to allow fluid to pass therethrough. Further provided is an acoustic core 30 which is disposed between and in fluid communication with the frontface skin 26 and the backface skin 28. The acoustic core 30 is formed to allow pressurized, heated fluid to pass therethrough. The acoustic core 30 is formed to attenuate sound. Thus, pressurized fluid is allowed to flow through the permeable acoustic layer 22 (i.e., the backface skin 28, the acoustic core 30 and the frontface skin 26) to interact with intake airflow, having a smoothing effect of the inlet 14 at the D-nose 18 and thereby reducing drag. Concurrently, the pressurized fluid provides sufficient heat so as to mitigate build-up on the inlet 14 at the D-nose 18. It is contemplated, although not shown, that the inlet liner continues from the D-nose 18 to the surface which is radially exterior of the inlet 14 and in contact with external airflow, rather than an intake airflow, for reducing external inlet friction and for performing an anti-icing function at that location.

In addition, in the preferred embodiment of the present invention, the frontface skin 26 is provided with pores 32 which are sized and configured to allow fluid to pass from the acoustic core 30 to the intake airflow while allowing sound waves to pass from the intake airflow to the acoustic core 30. The backface skin 28 is provided pores 34 which are sized and configured to allow fluid to pass to the acoustic core 30. This is a departure from conventional sound attenuation treatment, where an equivalent backface skin is typically solid. The acoustic core 30 is provided with honeycomb cells 36 which are sized and configured to attenuate sound.

It is contemplated that the attenuation of sound at various wavelengths is a function of the material type, texture and thickness of the frontface and backface skins 26, 28, the number of pores 32, 34 and the size, spacing and arrangement of the pores 32, 34 of the frontface and backface skins 26, 28. It is further contemplated that the size and configuration of the pores 32, 34 may be nonuniform so as to address various sound wave length ranges desired to be attenuated. It is contemplated that the number and size of the pores 32, 34 is a function of the desired pressurized fluid flow rates in order to perform drag reduction and anti-ice functions. In addition, it is contemplated that the sizing of the pores 32 of the front face skin 26 and the pressurized fluid flow rate through the pores 32 is a function of the amount of clogging or plugging of the pores 32 by foreign debris contained in the intake airflow (e.g., insects). It is contemplated that the decreasing the size of the pores 32 and increasing the pressurized flow rate will decrease the occurrence of clogging or plugging of the pores 32. The relative sizing, configuration and material selection of the above-discussed variables are well known to those skilled in the art. However, for illustrative purposes, an embodiment of the present invention, seeking to accommodate the various above-described design considerations, may provide for a frontface skin 26 to be constructed of a smooth microporous Nickel or equivalent material having a nominal 3–10% open area.

Furthermore, the attenuation of sound is contemplated to be a function of the material type, texture and thickness of the acoustic core 30. In the preferred embodiment, wherein the acoustic core 30 is provided with a plurality of honeycomb cells 36, acoustic performance is a function of, among other things, the dimensions and geometry of the honeycomb cells 36. It is contemplated that sound attenuation is facilitated by the Helmholz Resonator effect whereby cavities in the honeycomb cells 36 dissipate acoustical energy after its admittance through the frontface skin 26. It is contemplated that the honeycomb cells 36 may be filled with a sound absorption material (fiberglass, for example), thereby further enhancing acoustic performance. The relative sizing, configuration and material selection of the above-discussed variables are well known to those skilled in the art.

It is contemplated that the frontface and backface skins 26, 28 are attached to the acoustic core 30 by adhesive bonding or other suitable methods of attachment that will withstand the operating temperatures and pressures well known to those skilled in the art.

Referring now to FIGS. 3 and 4, in one embodiment of the present invention, the pressurized fluid injecting device 24 is provided with a plenum 38 which is in fluid communication with the backface skin 28. The pressurized fluid injecting device 24 is provided with at least one piccolo tube 40 which is disposed adjacent to the D-nose 18. Each piccolo tube 40 is generally ring shaped and annularly disposed within the inlet 14. Thus, each piccolo tube 40 forms an O-shape with the intake airflow passing therethrough. Each piccolo tube 40 has a plurality of holes 42 through which pressurized fluid is injected from within the piccolo tube 40 into the plenum 38. The pressurized fluid injecting device 24 is provided with a plenum wall 44 which is disposed within the inlet 14. The plenum wall 44, in conjunction with the backface skin 28, defines the plenum 38. The plenum wall 44 is provided with a D-nose portion 46 adjacent the D-nose 18 of the inlet 14, annularly disposed within the inlet 14 and generally perpendicular to the intake airflow. The plenum wall 44 is provided with an inlet portion 48 which is annularly disposed within the inlet 14 about the inner surface 16 of the inlet 14.

It is contemplated that the size, position and material selection of each piccolo tube 40 is a function of desired fluid flow rates and fluid temperature. In addition, it is contemplated that the number, sizing and configuration of the holes 42 is a function of desired fluid flow rates and fluid temperature. Likewise, the relative position, configuration and material selection of the plenum wall 44 is a function of desired fluid flow rates and fluid temperature. The above-discussed variables are well known to those skilled in the art.

Referring now to FIGS. 5 and 6, in another embodiment of the present invention, the pressurized fluid injecting device 24 is provided with a plenum 38 which is in fluid communication with the backface skin 28. The pressurized fluid injecting device 24 is provided with at least one swirl tube 50. Each respective swirl tube 50 is aligned generally parallel to the intake airflow. Each respective swirl tube 50 has a plurality of holes 52 through which pressurized fluid is injected from within the swirl tube 50 into the plenum 38 such that the injected fluid circulates circumferentially about the backface skin 28 within the plenum 38. In addition, the pressurized fluid injecting device 24 is provided with a plenum wall 44 which is disposed within the inlet 14. The plenum wall 44, in conjunction with the backface skin 28, defines the plenum 38. The plenum wall 44 is provided with a D-nose portion 46 adjacent the D-nose 18 of the inlet 14, annularly disposed within the inlet 14 and generally perpendicular to the intake airflow. The plenum wall 44 is provided with an inlet portion 48 which is annularly disposed within the inlet 14 about the inner surface 16 of the inlet 14.

It is contemplated that the size, position and material selection of each swirl tube 50 is a function of desired fluid flow rates and fluid temperature. In addition, it is contemplated that the number, sizing and configuration of the holes 52 is a function of desired fluid flow rates and fluid temperature. Likewise, the relative position, configuration and material selection of the plenum wall 44 is a function of desired fluid flow rates and fluid temperature. The above-discussed variables are well known to those skilled in the art.

In addition, wherein the inlet liner 20 constructed in accordance with the present invention, the pressurized fluid injecting device 24 is formed to inject fluid in response to sensed inlet conditions. The sensed inlet conditions may be any one or a combination of the following: drag on the inner surface 16 and D-nose 18, temperatures at the inner surface 16 and D-nose 18, ice build-up at the D-nose 18, and temperature, pressure and velocity of the intake airflow. In addition, the pressurized fluid injecting device 24 is provided with a plenum 38 in fluid communication with the permeable acoustic layer 22. Referring now to FIGS. 3 and 4, the pressurized fluid injecting device 24 is provided with at least one piccolo tube 40 which is disposed adjacent to the D-nose 18. Each piccolo tube 40 has a plurality of holes 42 through which a pressurized fluid is injected from within the piccolo tube 40 into the plenum 38. Each piccolo tube 40 is generally ring shaped and annularly disposed within the inlet 14. Further, the pressurized fluid injecting device 24 is provided with a plenum wall 44 which is disposed within the inlet 14. The plenum wall 44, in conjunction with the permeable acoustic layer 22, defines the plenum 38. The plenum wall 44 is annularly disposed within the inlet 14 and is generally perpendicular to the intake airflow.

Referring now to FIGS. 5 and 6, in addition, wherein the inlet liner 20 constructed in accordance with the present invention, the pressurized fluid injecting device 24 is provided with a plenum 30 which is in fluid communication with the permeable acoustic layer 22. The pressurized fluid injecting device 24 is provided with at least one swirl tube 50. Each swirl tube 50 is aligned generally parallel to the intake airflow. Each swirl tube 50 has a plurality of holes 52 through which pressurized fluid is injected from within the swirl tube 50 into the plenum 38 such that the injected fluid circulates circumferentially about the permeable acoustic layer 22 within the plenum 38. The pressurized fluid injecting device 24 is provided with a plenum wall 44 which is disposed within the inlet 14. The plenum wall 44, in conjunction with the permeable acoustic layer 22, defines the plenum 38. The plenum wall 44 is annularly disposed within the inlet 14 and is generally perpendicular to the intake airflow.

In addition, in accordance with the present invention, the pressurized fluid injecting device 24 is formed to inject fluid in response to sensed inlet conditions. The pressurized fluid injecting device is preferably formed to inject heated air taken from the intake airflow from downstream of the inlet 14 (e.g., from within the engine 12). Advantageously, the turbo engine 12 is a convenient source of pressurized, heated air which may be utilized by present invention. Nonetheless, it is contemplated that other sources of pressurized, heated fluid may be utilized which are well known to those skilled in the art.

In another embodiment of the present invention, there is provided a method of forming an inlet liner 20 for improved acoustic, anti-ice and drag performance. The method beings with the initial step of forming a permeable acoustic layer 22. The permeable acoustic layer 22 is formed to attenuate sound and defines the D-nose 18. A pressurized fluid is injected adjacent to the permeable acoustic layer 22 at the D-nose 18 to reduce drag of the intake airflow. The pressurized fluid is injected at a temperature sufficient to perform an anti-ice function. It is preferred that the permeable acoustic layer 22 is formed to define an inner surface 16 of a turbo engine inlet 14 and a pressurized fluid is injected adjacent to the permeable acoustic layer 22 at the inner surface 16 to further reduce drag of the intake airflow.

In the preferred embodiment, the permeable acoustic layer is constructed by first forming a frontface skin 26 which is formed to allow fluid to pass therethrough. A backface skin 28 is formed to allow fluid to pass therethrough. Finally, an acoustic core 30 is formed and disposed between and in fluid communication with the frontface skin 26 and the backface skin 28. The acoustic core 30 is constructed so as to allow pressurized, heated fluid to pass therethrough and is formed to attenuate sound. In addition, the injected pressurized fluid is injected in response to sensed inlet conditions. The sensed inlet conditions may be any one or a combination of the following: drag on the inner surface 16 and D-nose 18, temperatures at the inner surface 16 and D-nose 18, ice build-up at the D-nose 18, and temperature, pressure and velocity of the intake airflow. It is preferred that the injected pressurized fluid is heated air taken from the intake airflow from downstream of the inlet 14.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. In an air vehicle having a turbo engine including an inlet which receives intake airflow and is defined by an inner surface and a D-nose of the engine, an inlet liner for improved acoustic, anti-ice and drag performance comprising:

a permeable acoustic layer formed to attenuate sound and defining the D-nose and the inner surface, the acoustic layer comprises:
 a frontface skin formed to allow fluid to pass therethrough;
 a backface skin formed to allow fluid to pass therethrough; and an acoustic core disposed between and in fluid communication with the frontface skin and the backface skin, formed to allow pressurized, heated fluid to pass therethrough and to attenuate sound; and a pressurized fluid injecting device, in fluid communication with the acoustic layer, formed to inject fluid through the acoustic layer at the D-nose to reduce drag of the intake airflow and at a temperature sufficient to perform an anti-ice function thereat, formed to inject fluid through the acoustic layer at the inner surface to reduce drag of the intake airflow.

2. The inlet liner of claim 1 wherein the frontface skin having pores, sized and configured to allow fluid to pass from the acoustic core to the intake airflow and sound waves to pass from the intake airflow to the acoustic core.

3. The inlet liner of claim 1 wherein the backface skin having pores, sized and configured to allow fluid to pass to the acoustic core.

4. The inlet liner of claim 1 wherein the acoustic core having honeycomb cells, sized and configured to attenuate sound.

5. The inlet liner of claim 1 wherein the pressurized fluid injecting device comprises:

a plenum in fluid communication with the backface skin; and at least one piccolo tube disposed adjacent the D-nose, each respective piccolo tube having a plurality of holes for injecting fluid therethrough into the plenum, being generally ring shaped and annularly disposed within the inlet.

6. The inlet liner of claim 5 wherein the pressurized fluid injecting device further comprises a plenum wall disposed within the inlet, defining the plenum in conjunction with the backface skin, having a D-nose portion adjacent the D-nose of the inlet and annularly disposed within the inlet and generally perpendicular to the intake airflow, and having an inlet portion annularly disposed within the inlet about the inner surface of the inlet.

7. The inlet liner of claim 1 wherein the pressurized fluid injecting device comprises:

a plenum in fluid communication with the backface skin; and at least one swirl tube, each respective swirl tube being generally parallel to the intake airflow, having a plurality of holes for injecting fluid therethrough into the plenum such that the injected fluid circulates circumferentially about the backface skin within the plenum.

8. The inlet liner of claim 7 wherein the pressurized fluid injecting device further comprises a plenum wall disposed within the inlet, defining the plenum in conjunction with the backface skin, having a D-nose portion adjacent the D-nose of the inlet, annularly disposed within the inlet and generally perpendicular to the intake airflow, and having an inlet portion annularly disposed within the inlet about the inner surface of the inlet.

9. The inlet liner of claim 1 wherein the pressurized fluid injecting device formed to inject fluid in response to sensed inlet conditions comprising at least one of drag on the inner surface and D-nose, temperatures at the inner surface and D-nose, ice build-up at the D-nose, and temperature, pressure and velocity of the intake airflow.

10. The inlet liner of claim 1 wherein the pressurized fluid injecting device formed to inject fluid in response to sensed inlet conditions.

11. The inlet liner of claim 1 wherein the pressurized fluid injecting device formed to inject heated air taken from the intake airflow from downstream of the inlet.

12. In an air vehicle having a turbo engine including an inlet which receives intake airflow and is defined by an inner surface and a D-nose of the engine, an inlet liner for improved acoustic, anti-ice and drag performance comprising:

a permeable acoustic layer defining the D-nose and formed to attenuate sound; and a pressurized fluid injecting device, in fluid communication with the acoustic layer, formed to inject fluid through the acoustic layer at the D-nose to reduce drag of the intake airflow and at a temperature sufficient to perform an anti-ice function thereat, the pressurized fluid injecting device comprises:

a plenum in fluid communication with the acoustic layer; and a piccolo tube disposed adjacent the D-nose, the piccolo tube having a plurality of holes for injecting fluid therethrough into the plenum, being generally ring shaped and annularly disposed within the inlet.

13. The inlet liner of claim 12 wherein the pressurized fluid injecting device further comprises a plenum wall disposed within the inlet, defining the plenum in conjunction with the permeable acoustic layer, and annularly disposed within the inlet and generally perpendicular to the intake airflow.

14. In an air vehicle having a turbo engine including an inlet which receives intake airflow and is defined by an inner surface and a D-nose of the engine, an inlet liner for improved acoustic, anti-ice and drag performance comprising:

a permeable acoustic layer defining the D-nose and formed to attenuate sound; and a pressurized fluid injecting device, in fluid communication with the acoustic layer, formed to inject fluid through the acoustic layer at the D-nose to reduce drag of the intake airflow and at a temperature sufficient to perform an anti-ice function thereat, the pressurized fluid injecting device comprises:

a plenum in fluid communication with the acoustic layer; and a swirl tube disposed generally parallel to the intake airflow, having a plurality of holes for injecting fluid therethrough into the plenum such that the injected fluid circulates circumferentially about the acoustic layer within the plenum.

15. The inlet liner of claim 14 wherein the pressurized fluid injecting device further comprises a plenum wall disposed within the inlet, defining the plenum in conjunction with the permeable acoustic layer, annularly disposed within the inlet and generally perpendicular to the intake airflow.

16. In an air vehicle, a turbo engine which receives intake airflow for improved acoustic, anti-ice and drag performance comprising:

a D-nose;

an inner surface adjacent the D-nose;

a permeable acoustic layer defining the D-nose and the inner surface, the acoustic layer comprising:

a frontface skin formed to allow fluid to pass therethrough;

a backface skin formed to allow fluid to pass therethrough; and an acoustic core disposed between and in fluid communication with the frontface skin and the backface skin, formed to allow pressurized, heated fluid to pass therethrough and to attenuate sound; and a pressurized fluid injecting device in fluid communication with the acoustic layer, formed to inject fluid through the permeable acoustic layer at the D-nose to reduce drag of the intake airflow and at a temperature sufficient to perform an anti-ice function thereat, formed to inject fluid through the acoustic layer at the inner surface to reduce drag of the intake airflow.

17. In an air vehicle having a turbo engine including an inlet which receives intake airflow and is defined by an inner surface and a D-nose of the engine, a method of forming an inlet liner for improved acoustic, anti-ice and drag performance comprising the following steps:
(a) forming a permeable acoustic layer formed to attenuate sound and defining the D-nose and the inner surface adjacent to the D-nose, the acoustic layer being formed by the following steps:
(i) forming a frontface skin formed to allow fluid to pass therethrough;
(ii) forming a backface skin formed to allow fluid to pass therethrough; and
(iii) forming an acoustic core disposed between and in fluid communication with the frontface skin and the backface skin, formed to allow pressurized, heated fluid to pass therethrough and to attenuate sound;
(b) injecting a pressurized fluid adjacent the acoustic layer at the D-nose to reduce drag of the intake airflow and at a temperature sufficient to perform an anti-ice function thereat; and
(c) injecting a pressurized fluid adjacent the acoustic layer at the inner surface to reduce drag of the intake airflow.

18. The method of claim 17 wherein step (a) further comprising injecting pressurized fluid in response to sensed inlet conditions comprising at least one of drag on the inner surface and D-nose, temperatures at the inner surface and D-nose, ice build-up at the D-nose, and temperature, pressure and velocity of the intake airflow.

19. The method of claim 17 wherein step (b) wherein the pressurized fluid being heated air taken from the intake airflow from downstream of the inlet.

* * * * *